Patented Apr. 6, 1926.

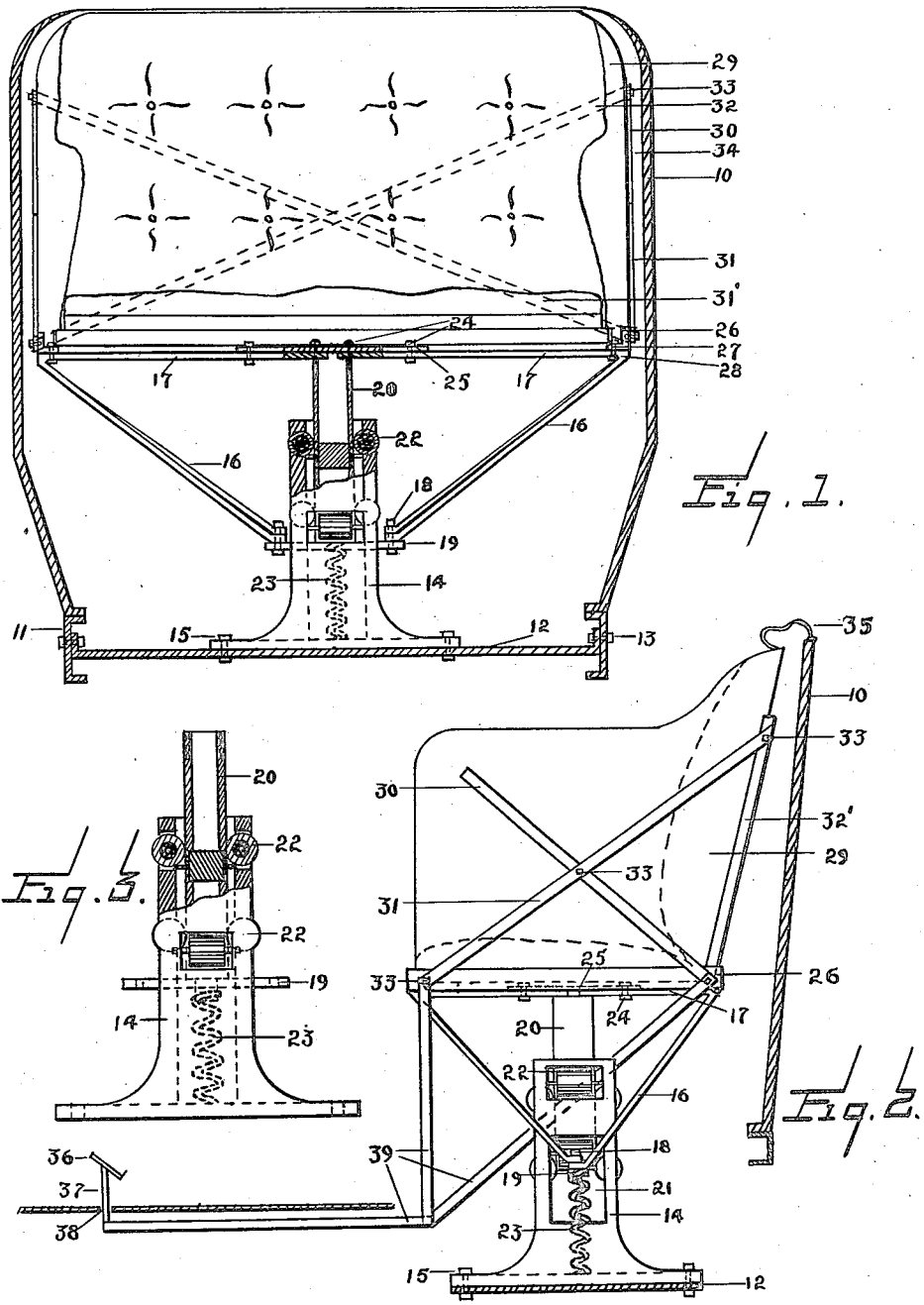

1,579,281

UNITED STATES PATENT OFFICE.

GEORGE EDWIN COUGHLIN, OF NEW YORK, N. Y.

VEHICLE SPRING SEAT.

Application filed June 6, 1924. Serial No. 718,367.

*To all whom it may concern:*

Be it known that I, GEORGE EDWIN COUGHLIN, a citizen of the United States, residing at New York city, in the county and State of New York, have invented a new and useful Vehicle Spring Seat, of which the following is a specification.

My invention relates to improvements in a vehicle spring seat, and the object of the invention is to provide a vehicle seat suitably mounted on an effective cushioning device.

A further object is to provide a seat adapted to function as a unit, under the resilient action of a centrally positioned cushioning device.

My invention consists in a device for use in connection with a vehicle seat, and comprises a seat frame, a hollow pedestal attached to the floor of the vehicle, a spring seated within the said pedestal, and a plunger engaging at its upper end with the said seat frame, and at its lower end with the said spring. Suitable braces are attached at their upper ends to the said seat frame, and at their lower ends to the lower end of the plunger, where the latter engages with the said spring. I also provide roller bearings located within said pedestal, and adapted to engage with the sides of the plunger in connection with its vertical movement; the parts being constructed and arranged all as hereinafter more particularly described in the accompanying drawing in which:—

Fig. 1 shows a front elevation, partly in section, of a vehicle seat mounted on my cushioning device.

Fig. 2 is a side elevation, partly in section, of the same construction as illustrated in Fig. 1.

Fig. 3 is an enlarged detail elevation, partly in section, of my pedestal, showing the plunger, spring and roller bearings, but having the braces omitted.

Like characters of reference indicate corresponding parts of the different views.

10 is the tonneau frame of an automobile. 11 are the lateral structural beams of a chassis. 12 is a strong cross beam spanning the lateral chassis beams and secured thereto by rivets 13. 14 is a hollow pedestal, centrally mounted on the cross beam 12, and secured thereto by bolts 15. 16 are the angular and 17 the horizontal sections of V shaped brace members. The angular sections 16 are secured by bolts 18 to a cross bar 19, located on the base of the plunger 20. Said cross bar 19 is adapted to slide vertically in slots 21 suitably positioned in the walls of the pedestal 14. Roller bearings 22 are located in the walls of the pedestal 14 and are so positioned as to engage the sides of the vertically slidable plunger 20. The lower part of the pedestal 14 encases a vertical coil spring 23 on which the cross bar 19 of the plunger 20 is mounted. The horizontal sections 17 of the V shaped brace members are secured by bolts 24 to a horizontal metallic plate 25 located centrally of the bench part of the seat frame work, and to the top of the plunger 20. Angle iron supporting members 26 are secured by bolts 27 to the ends of the brace members 17, at the point 28, and form a rectangular frame within which rests the upholstered seat 29. Further lateral and back supporting members 30, 31, 31$^1$, 32 and 32$^1$ secured to the angle irons 26 by bolts 33 serve to position the seat inwardly of the tonneau frame 10. The seat is thus so located as to be free to move in a substantially vertical plane under the actuation of the resilient device. The space 34 left between the bracing members 30, 31, 31$^1$, 32 and 32$^1$, and the tonneau frame 10 is enclosed from view when the seat is in place, by means of a flexible flap 35 secured to the tonneau frame 10 and to the top of the upholstered seat 29. When desirable a foot rest 36 mounted on a vertical member 37 extending through a slot 38 cut in the floor of a car is made integral with the other parts actuated by the resilient device by connecting members 39 secured to the angle irons 26, and to the vertical supporting member 37.

The above described cushioning device will, I believe, eliminate jars, shocks and vibration which in present automobiles are conveyed to the bodies of passengers through the present type of side upholstery and arm rests and back cushions all of which are now fixed firmly to the body of the car.

The mobility of the vertical portions of the seat and suspension of the entire unit seat on springs gives to the vertical portions the same degree of resiliency that the present type of horizontal cushion possesses, and eliminates the shock and vibration conveyed by the vertical portions of the present type but not by the horizontal part thereof because of the suspension of the latter on resilient coil springs. The new device also avoids pinching and jarring caused by antagonistic motions of vertical and horizontal portions of the seat. The construction of upholstery or cushions may be of the present standard type, with the omission or not as may be desirable of the present coil springs under the horizontal seat.

The drawings are of a rear seat. The device with slight variations can be applied to other seats as well and is intended to be so applied.

The foot-rest device is a matter which is not essential to the seat arrangement and may be dispensed with where not desired. It is advocated as an arrangement necessary to complete the general scheme, namely, to suspend on suitable, resilient springs all parts of the car which bear the passenger's weight, and to avoid contact of passengers' bodies with parts of the car which are necessarily suspended on the heavy chassis springs only.

As the vertical portions of the seat will move up and down within the car body means must be provided either to form a sliding contact between the car body and the seat or to so position the seat as to prevent contact with the body walls. The latter plan is described above.

I claim:—

In a vehicle spring seat the combination with a hollow pedestal adapted to be secured to the floor of the vehicle and provided with main side slots and guide rollers journalled in supplemental slots, of a seat, a plunger suitably secured centrally to the bottom thereof and extending into the pedestal and between the opposite rollers, a spring interposed between the bottom of the plunger and the bottom of the interior of the pedestal, a crossbar secured to the bottom of the plunger and extending outwardly through the main slots of the pedestal and braces connecting the crossbar at each end to each end of the seat.

GEORGE E. COUGHLIN.